April 13, 1965
P. GRANDSTAFF
3,177,892
FLOW REGULATOR
Filed May 23, 1963
2 Sheets-Sheet 1
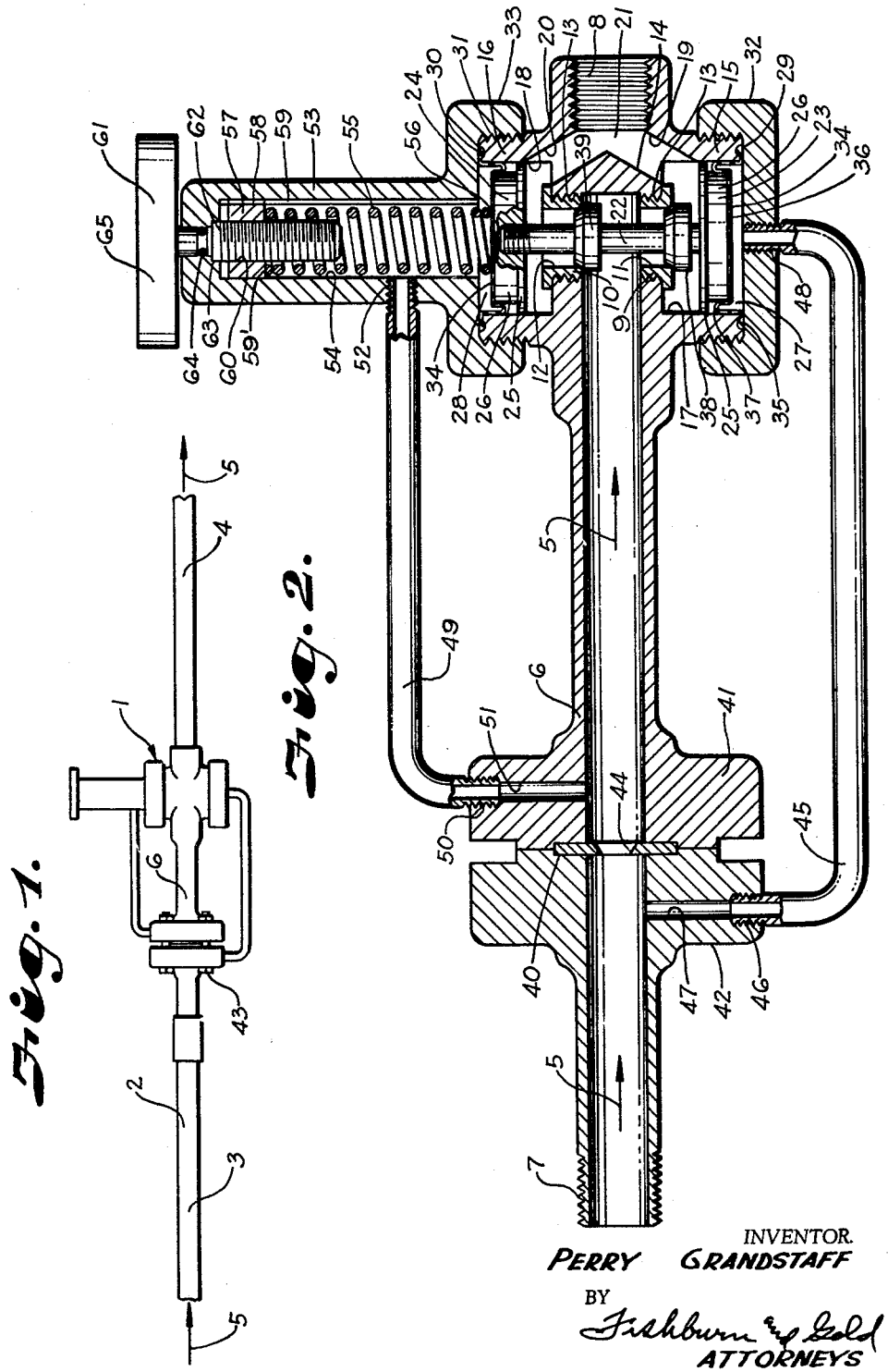
INVENTOR.
PERRY GRANDSTAFF
BY
Fishburn & Gold
ATTORNEYS April 13, 1965  P. GRANDSTAFF  3,177,892
FLOW REGULATOR
Filed May 23, 1963  2 Sheets-Sheet 2
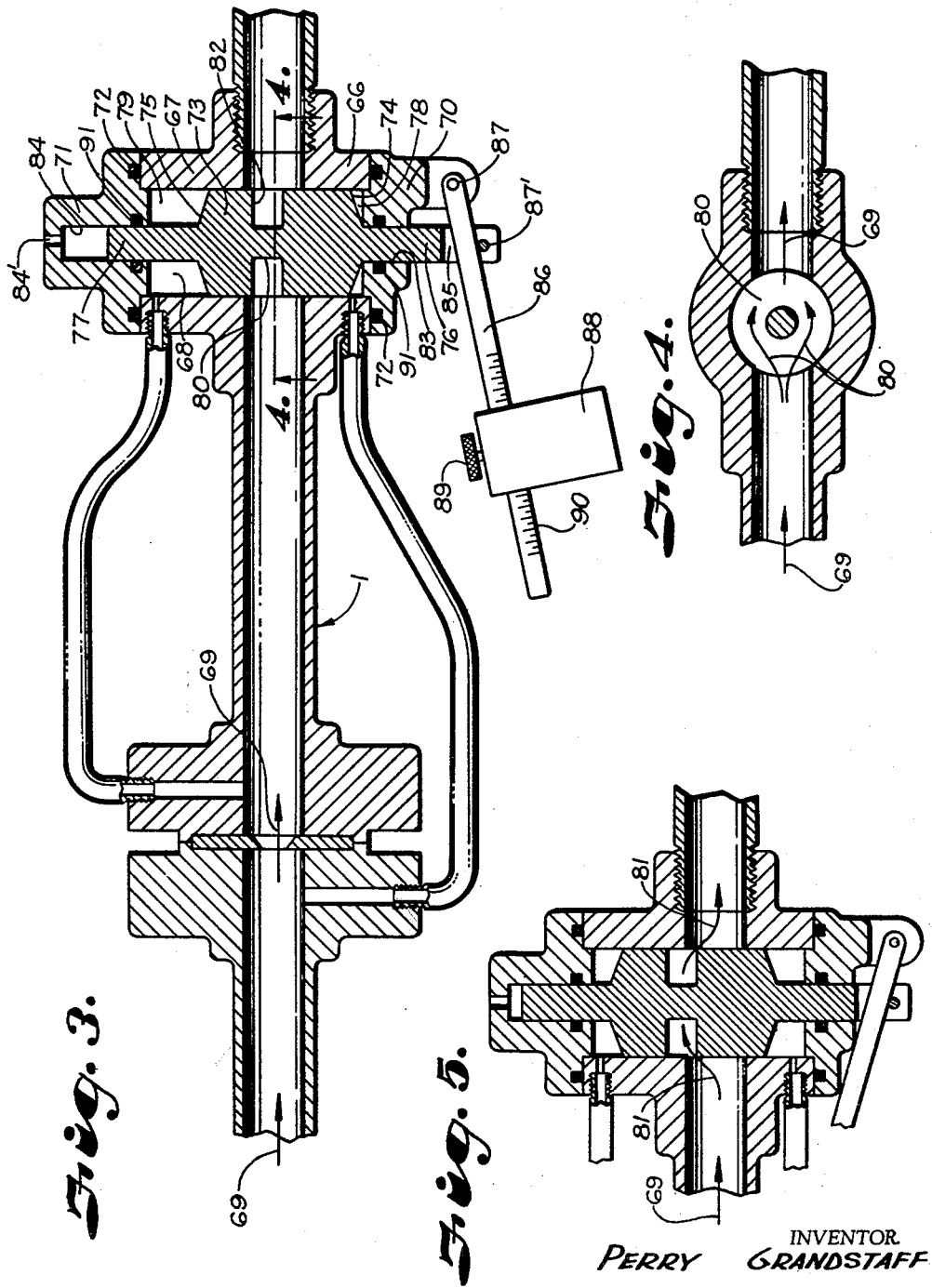
INVENTOR
PERRY GRANDSTAFF
BY
Fishburn & Gold
ATTORNEYS

United States Patent Office 3,177,892
Patented Apr. 13, 1965

3,177,892
FLOW REGULATOR
Perry Grandstaff, Oklahoma City, Okla., assignor to Drilling Equipment Manufacturing Co., Oklahoma City, Okla., a corporation of Oklahoma
Filed May 23, 1963, Ser. No. 282,725
1 Claim. (Cl. 137—501)

This invention relates to flow control regulators and more particularly to such regulators for automatically controlling the volume rate of flow through a pipe.

The principal objects of the present invention are: to provide a flow control valve upon which variations in fluid pressure upstream or downstream therefrom within wide limits has no substantial effect on the volume rate of flow therethrough; to provide such a valve which is balanced in structure so as to cancel out the effects of varying velocity flow therethrough in order to deliver a desired adjusted rate of flow; to provide a fluid flow regulator designed in such a manner that low friction of movable control members and equal areas on opposed hydraulic pressure responsive control portions provide rapid, accurate response over a wide range of operating conditions; to provide such a regulator which operates through the use of the differential pressure between oppositely disposed pressure containing static cavities; and to provide such a fluid control device which is simple and rugged in construction, reliable in use and easily adjustable.

Other objects and advantages of this invention will become apparent from the following description taken in connection with the accompanying drawings wherein are set forth by way of illustration and example certain embodiments of this invention.

FIG. 1 is a fragmentary side elevational view showing a control valve embodying this invention mounted on a pipe for controlling the volume rate of flow therethrough.

FIG. 2 is a vertical cross-sectional view through the control valve of FIG. 1 on an enlarged scale showing the relationship of parts therein.

FIG. 3 is a vertical cross-sectional view of another form of control valve embodying this invention.

FIG. 4 is a fragmentary view taken on the line 4—4 of FIG. 3 showing the flow path through the control valve.

FIG. 5 is a fragmentary vertical cross-sectional view through the embodiment of FIG. 3 showing a valve member in a flow restricting position.

Referring to the drawings in more detail:

The reference numeral 1 indicates generally a pressure independent volume rate of fluid flow control valve embodying this invention. The control valve 1 is illustrated connected in a pipe 2 having an upstream portion 3 and a downstream portion 4 thereof. The pipe 2 directs fluid in a path designated by the arrows 5 to and from the control valve 1.

The control valve 1 comprises a valve body broadly designated 6 and adapted for connection in the pipe 2 by means of suitable pipe threads 7 and 8 in the usual manner. The body 6 supports spaced apart first and second oppositely disposed valve seat members 9 and 10 respectively having equal diameter flow passageways 11 and 12 therethrough. The valve seat members 9 and 10, in the illustrated example, are suitably engaged in the body 6 by means of screw threads 13. The flow passageways 11 and 12 are coaxially aligned and positioned on opposite sides of and transversely of the fluid flow path designated by the arrows 5 for equally dividing and directing the fluid flow in opposite directions. In the illustrated example the entire flow must flow through the passageways 11 and 12 since the normal flow path is otherwise blocked by an abutment 14 forming a part of the valve body 6.

The valve body 6 has aligned cylindrical walls 15 and 16 forming equal diameter cylindrical cavities 17 and 18 coaxially aligned with the flow passageways 11 and 12 and respectively communicating therewith downstream therefrom. Equal length and diameter passageways 19 and 20 are formed by the body 6 and respectively communicate with the cavities 17 and 18 and converge at equal angles to the flow path 5 into a discharge portion 21 adjacent the connecting threads 8.

A valve stem 22 of substantially smaller diameter than the flow passageways 11 and 12 extends coaxially therethrough and terminates at opposite ends thereof in the respective cavities 17 and 18. Pistons respectively designated 23 and 24 are fixed to the opposite ends of the valve stem 22 for axial motion within the respective cavities 17 and 18. The pistons 23 and 24 each have a skirt portion 25 slidably engaged with the cylindrical walls 15 and 16 and cylindrical outer end portions 26 of smaller diameter than the skirt portions 25. The pistons 23 and 24 form respective outer chambers 27 and 28 with the cavity walls 15 and 16, the chambers terminating in respective outer lips 29 and 30 formed by the outer ends of the cylindrical walls 15 and 16.

The cylindrical walls 15 and 16 have exterior threads 31 thereon and cap members designated 32 and 33 are respectively engaged therewith. Flexible sealing diaphragms 34 have the periphery 35 thereof secured between the outer lips 29 and 30 and the respective cap members 32 and 33. The body 36 of the flexible diaphragms 34 contacts the respective pistons 23 and 24 and are adapted to fold between the walls of the cylindrical cavities 17 and 18 and the piston end portions 26 during axial motion of the pistons as indicated at 37.

Valve closure members 38 and 39 are fixed to the valve stem 22 in spaced relation and are respectively adapted to simultaneously seat against the respective valve seat members 9 and 10 upon axial motion of the stem in an upward direction as illustrated in FIG. 2 and simultaneously move away from the respective valve seat members upon axial motion of the stem in the other direction.

An orifice plate 40 is operatively mounted in the body 6 between body flanges 41 and 42 secured together by means of suitable bolts 43. The orifice plate 40 has an orifice 44 of smaller diameter than the diameter of the flow path at 5 formed by the valve body 6 and is located in the flow path upstream from the valve seat members 9 and 10. A first or high pressure tube 45 is connected at one end 46 thereof with the body flange 42 which has a passageway 47 therethrough permitting the tube end 46 to communicate with the flow passageway upstream from the orifice plate 40. The other end 48 of the high pressure tube 45 is attached to and communicates through the cap member 32, opening into the outer chamber 27. A second or low pressure tube 49 is connected at one end 50 thereof to the body flange 41 where it communicates with a passageway 51 extending through the body flange 41 and opening into the flow passageway downstream from the orifice plate 40. The other end 52 of the tube 49 opens into a neck portion 53 of the cap member 33. The neck portion 53 extends coaxially outwardly from the cap member 33 and is hollow therewithin at 54 whereby the tube 49 communicates with the outer chamber 28.

An elongated compression spring 55 is contained coaxially in the neck portion 53 and has one end 56 thereof bearing against the diaphragm 34 of the piston 24. A block 57 is slidably retained in the neck portion 53 and has a suitable guide protrusion 58 extending therefrom and engaged in a groove 59 in the neck portion 53 to permit the block 57 to axially slide within the follow 54 but prevent rotation with respect thereto. The other end 59' of the compression spring 55 bears against the block 57.

The block 57 has a threaded bore 60 therethrough and adjusting member 61 has a threaded shank 62 extending coaxially into the neck portion 53 and engaged in the threaded bore 60. The adjusting member 61 is rotatably mounted and longitudinally fixed with respect to the neck portion 53 by engaging therewith at 63 and a seal 64 is located between the neck portion and adjusting member to prevent leakage therebetween. The adjusting member 61 terminates at the upper end thereof in a suitable handle 65 for selectively rotating the threaded shank 62 which results in a variation in spring pressure on the piston 24.

In operation, the flowing fluid in the passageway at 5 will create a higher pressure upstream from the orifice plate 40 than downstream therefrom. The respective upstream and downstream pressures are transferred by the respective tubes 45 and 49 to the respective outer chambers 27 and 28 where they appear as static pressures therein. The upstream pressure sensed in the outer chamber 27 tends to close the valve closure members 38 and 39 and the pressure in the outer chamber 28 tends to urge same open. The hydraulic force in the chamber 27 is greater under any condition of flow than the pressure in the chamber 28. The pressure exerted by the compression spring 55 produces an overcoming force tending to open the valve closure members to the point where the desired volume rate of flow passes through the respective flow passageways 11 and 12 and out the exit passageways 19 and 20. The spring force is adjusted to equal the force created by the differential pressure across the orifice plate 40 for the particular volume of flow desired. The differential pressure across the orifice plate 40 is substantially independent of variations or fluctuations in upstream or downstream pressure and is proportional to the volume rate of flow therethrough. Since the passageways 11 and 12 and valve closure members 38 and 39 present substantially identical profiles and are spaced on opposite sides of the flow path 5, the effects of velocity variations in the flow due to changes in spring pressure are substantially balanced out and do not introduce unwanted reactions on the valve mechanism. The differential pressure across the orifice plate 40, or in other words, the volume rate of flow therepast is altered by rotating the handle 65 and the adjusted flow-through will be maintained so long as a sufficient differential pressure exists in the pipe 2 to induce a minimum flow through the valve body 6. It is noted that the pressure sensitive areas on the pistons 23 and 24 are identical whereby equal corrective forces are obtained for both opening and closure of the valve closure members 38 and 39. It is further noted that the internal configuration of the cylindrical cavities 17 and 18 and exit passageways 19 and 20 communicating respectively therewith are symmetrical on opposite sides of the flow path 5 in order to maintain balance in the valve although the velocity therethrough will vary depending upon the volume rate of flow called for by the degree of compression of the compression spring 55.

Referring to FIG. 3, a second embodiment of this invention is illustrated and comprises a valve body 66 having cylindrical walls 67 forming a cylindrical cavity 68 transversely intersecting and extending equal distances on opposite sides of the path of flow 69. Oppositely disposed cap members 70 and 71 having suitable seals 72 associated therewith close the opposite ends of the cavity 68. A cylindrical valve member 73 has oppositely extending ends 74 and 75 of equal surface area. The cylindrical valve member 73 is longitudinally slidable in the cavity 68 and has guide extensions respectively designated 76 and 77 extending axially past the respective ends 74 and 75 in opposite directions. Respective chambers 78 and 79 are formed in the cavity 68 between the respective cap members 70 and 71 and the respective ends 74 and 75.

The valve member 73 has an indentation 80, in the illustrated example, in the form of an annular ring extending thereinto and positioned to present a split pathway 91 therepast. The walls 82 which form the indentation 80 are so positioned on the valve member 73 that they cooperate with the valve body to selectively restrict fluid in the path 81 in response to variations in axial position of the valve member 73, FIG. 5.

Guide sockets 83 and 84 are respectively formed in the cap members 70 and 71 for axially guiding the guide extensions 76 and 77 of the valve member 73. The socket 84 has an air bleed hole 84'. The guide extension 76 extends through the cap member 77 and terminates in a bifurcation or slot 85 located externally of the valve body 66. An arm 86 is pivotally mounted at one end thereof at 87 to the cap member 70 and extends through the slot 85. The arm 86 is loosely retained in the slot 85 by means of a pin 87' extending thereacross. A weight 88 is longitudinally slidable along the arm 86 and may be locked in a desired position therealong by means of a lock screw 89. The arm 86 has suitable indexing marks 90 therealong for locating the weight 88 in the desired position corresponding to calibrated flow through the valve body 66. The weight 88 tends to pivot the arm 86 downwardly with a force which is transmitted through the pin 87' to the valve member 73 for offsetting the greater pressure produced in the chamber 88 as described above in the embodiment of FIG. 2. Suitable seals 91 permit axial motion of the valve member 73 in the cavity 68 without leakage past the guide extensions 76 and 77.

It is to be understood that while certain forms of this invention have been illustrated and described it is not to be limited to the specific form or arrangement of parts herein described and shown except insofar as such limitations are included in the claim.

What I claim and desire to secure by Letters Patent is:

A volume rate of flow control valve for controlling the flow of fluids through a pipe comprising:

(a) a valve body for connection in the pipe to receive fluid flow therefrom and adapted to direct same in a path, (b) said body supporting spaced apart first and second oppositely disposed valve seat members respectively having equal diameter first and second flow passageways therethrough, said flow passageways being coaxially aligned and positioned on opposite sides of and transversely of the fluid flow path for equally dividing and directing the fluid flow in opposite directions, (c) said valve body having first and second cylindrical walls forming first and second equal diameter cylindrical cavities coaxially aligned with said first and second flow passageways and respectively communicating therewith downstream therefrom, said valve body forming equal diameter and length exist passageways located symmetrically about said path and respectively communicating with said cavities and converging into a discharge connection member, (d) a valve stem of smaller diameter than said flow passageways and extending coaxially therethrough, said stem terminating at opposite ends thereof in said respective said first and second cavities, a piston of equal pressure responsive surface in each of said cavities and fixed to said stem ends for axial motion in said cavities, said pistons having diameters substantially greater than said first and second flow passageways, (e) said pistons each having a skirt portion slidably engaged with said cylindrical walls and a cylindrical central end portion of smaller diameter than said skirt portion, (f) a first and second flexible sealing diaphragm having the periphery thereof secured between said cyindrical walls and said cap members and the body thereof contacting said respective pistons, said diaphragms being adapted to fold between said cylindrical walls and said piston end portions during axial motion of said pistons, (g) first and second cap members engaged with said first and second cavity walls and forming first and second chambers between said respective cap members and said pistons, (h) a first and second valve closure member fixed to said stem in spaced relation and respectively adapted to simultaneously seat against said valve seat members upon axial motion of said stem in one direction and simultaneously move away therefrom upon axial motion of said stem in the other direction, (i) an orifice plate operatively mounted in said body and located in said fluid flow path upstream from said valve seat members, a first tube connected into said body at a point upstream from said orifice plate and communicating with said first chamber, a second tube connected into said body at a point between said orifice plate and said valve seat members and communicating with said second chamber, and (j) resilient means associated with said body and continuously operatively bearing axially on one of said pistons in said other direction for overcoming the force on said stem produced by differential pressure in said chambers, (k) whereby said control valve is balanced for cancelling out the effects of upstream and downstream pressure fluctuations and velocity changes.

References Cited by the Examiner

UNITED STATES PATENTS

| | | | |
|---|---|---|---|
| 1,480,909 | 1/24 | Johnson | 137—505.41 |
| 1,767,270 | 6/30 | Woodsome | 137—505.18 |
| 1,787,686 | 1/31 | Kerr | 137—501 |
| 2,255,787 | 9/41 | Kendrick | 137—501 |
| 2,881,793 | 4/59 | Lee | 137—501 |
| 2,916,047 | 12/59 | Butcher | 137—501 |
| 2,989,991 | 6/61 | Knobel | 92—92 XR |
| 3,082,991 | 3/63 | Watkins | 251—61 |

M. CARY NELSON, *Primary Examiner.*

MARTIN P. SCHWADRON, *Examiner.*